UNITED STATES PATENT OFFICE.

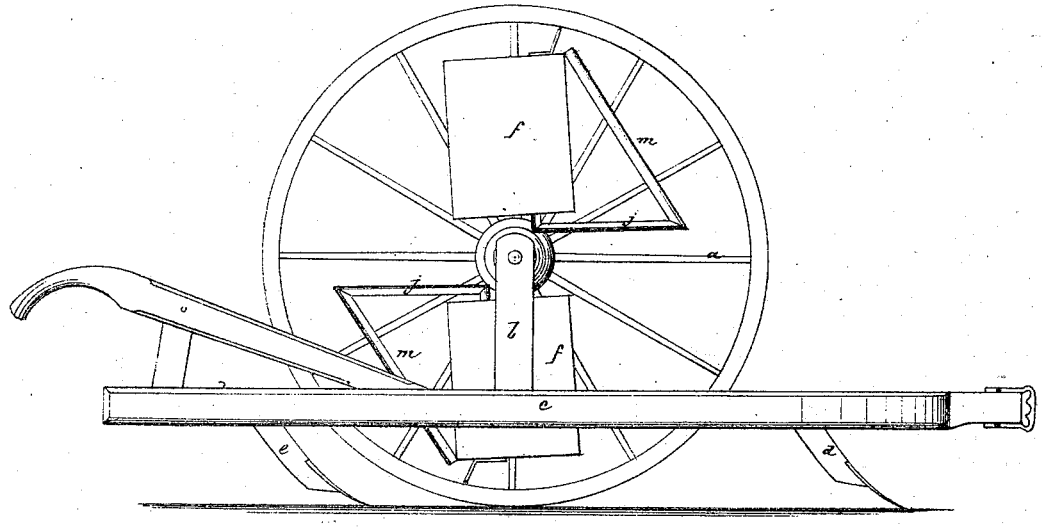
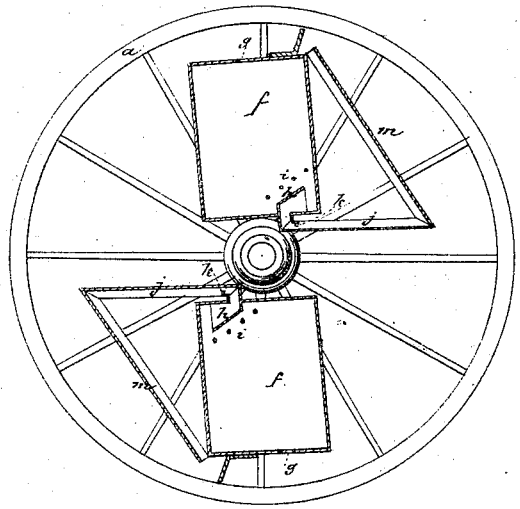

JAMES A. KNETZER, OF FILLMORE, INDIANA.

IMPROVEMENT IN CORN-PLANTERS.

Specification forming part of Letters Patent No. 117,646, dated August 1, 1871.

*To all whom it may concern:*

Be it known that I, JAMES A. KNETZER, of Fillmore, in the county of Putnam and State of Indiana, have invented a new and Improved Corn-Planter; and I do hereby declare the following to be a full, clear, and exact description of the same, reference being had to the accompanying drawing making a part of this specification, in which—

Figure 1 is a side elevation, and Fig. 2 is a horizontal longitudinal section through the cans and spouts.

This invention relates to an apparatus for planting corn by means of cans containing the seed and affixed to the side of a wheel, from which cans the corn is conducted in proper quantities through spouts to the deliveries at the perimeter of the wheel.

Referring to the drawing, $a$ is the wheel aforesaid, the same being mounted in standards $b$ that project upward from the side rails $c$ of a frame that bears a furrowing-plow, $d$, at its front end, and two covering-plows, $e$, one at each side of the furrowing-plow, at its rear end. $ff$ are the cans aforesaid, the same being affixed to the wheel $a$ in diametrically opposite positions and at the same distance from the center. The cans are provided with orifices $g$ at their outer ends, at which corn is poured in through funnels. Through the inner end of each can $f$ a thimble, $h$ is passed, of the proper size to measure out a charge. Each thimble $h$ is filled whenever during the revolution of the wheel the cam to which it is attached stands vertically. Wires $i$ are placed in a diagonal row across the inner corner of each can nearest the thimble, extending past the mouth of the same, for the purpose of preventing the corn from clogging in the can and thus failing to fill the thimble. To the outer end of each thimble a spout, $j$, is attached, the same leading from the thimble to the delivery, which is at the nearest outer corner of the can, in an angular form, one section of the spout extending parallel to the inner end of the can, and the other section $m$ running inclined from the outer extremity of the first section to the delivery, this indirectness of route serving to prevent untimely deliveries of seed from the spout. A small blade, $k$, is placed at the junction of each thimble and spout to prevent too much seed from entering the latter at any one time. Attached to the outer end of each can is an apron, $l$, extending past the mouth of the spout to scatter the seed at the time of its reissue.

This planter requires no marking of the ground to indicate the proper positions of the hills, inasmuch as it deposits seed at the right points with mathematical exactness. At each end of the field, after turning, one of the deliveries should be placed in line with the outside row of hills already dropped. This insures the dropping of each hill in its proper transverse row, the intervals between the hills being always the same.

Having thus described my invention, what I claim as new, and desire to secure by Letters Patent, is—

The combination of wheel $a$, can $f$, spout $j$ $m$, thimble $h$, and wires $i$, as and for the purpose specified.

JAMES A. KNETZER.

Witnesses:
J. L. NAVE,
D. W. ALSPAUGH.